United States Patent [19]

Zandona et al.

[11] Patent Number: 4,753,907

[45] Date of Patent: Jun. 28, 1988

[54] FLUID PARTICLE MATERIAL REGENERATION METHOD AND APPARATUS

[75] Inventors: Oliver J. Zandona; Paul W. Walters, both of Ashland; Roger M. Benslay, Catlettsburg, all of Ky.

[73] Assignee: Ashland Oil, Inc., Ashland, Ky.

[21] Appl. No.: 778,594

[22] Filed: Sep. 20, 1985

Related U.S. Application Data

[60] Division of Ser. No. 628,924, Jul. 9, 1984, which is a continuation-in-part of Ser. No. 304,992, Sep. 1, 1981, Pat. No. 4,434,044.

[51] Int. Cl.$^4$ .............................................. B01J 20/34
[52] U.S. Cl. .......................................... 502/20; 502/21; 502/38; 502/42; 502/44; 208/73; 208/164; 208/159; 208/160; 208/161; 208/168; 208/52 CT
[58] Field of Search ................. 208/164, 73, 159, 160, 208/161, 168, 52 CT; 502/38, 20, 21, 41, 44

[56] References Cited

U.S. PATENT DOCUMENTS

| | | | |
|---|---|---|---|
| 2,378,607 | 6/1945 | Watts | 208/164 |
| 2,662,050 | 12/1953 | Moorman et al. | 502/44 |
| 3,169,918 | 2/1965 | Gleim | 208/216 R |
| 4,057,397 | 11/1977 | Gross et al. | 208/164 |
| 4,064,039 | 12/1977 | Penick | 502/44 |
| 4,219,442 | 8/1980 | Vickers | 502/44 |
| 4,309,308 | 1/1982 | Vickers | 208/164 |
| 4,364,849 | 12/1982 | Vickers et al. | 502/44 |
| 4,434,044 | 2/1984 | Busch et al. | 208/91 |
| 4,490,241 | 12/1984 | Chen | 208/75 |
| 4,690,802 | 9/1987 | Jenkinson | 502/44 |
| 4,698,212 | 10/1987 | Walters et al. | 208/159 |

Primary Examiner—Helen M. S. Sneed
Assistant Examiner—Helane Myers
Attorney, Agent, or Firm—Richard C. Willson, Jr.; C. William Crady

[57] ABSTRACT

Solids e.g. catalysts are separated from suspensions in gases e.g. products from catalytic cracking of crude oil fractions a discharging of suspensions against a surface positioned above the outlet of a riser conduit through which the suspensions are flowing and collecting the displaced gases for passage to cyclones.

5 Claims, 2 Drawing Sheets

FLUID PARTICLE MATERIAL REGENERATION METHOD AND APPARATUS

This application is a divisional of U.S. Ser. No. 628,924, filed July 9, 1984, still pending, which is in turn a continuation-in-part of application U.S. Ser. No. 304,992, filed Sept. 1, 1981, now U.S. Pat. No. 4,434,044, issued Feb. 28, 1984.

BACKGROUND OF THE INVENTION

Crude oil from which desired gaseous and liquid fuels are made contains a diverse mixture of hydrocarbons and other compounds which vary widely in molecular weight and therefore boil over a wide range. For example, crude oils are known in which 30 to 60% or more of the total volume of oil is composed of compounds boiling at temperatures above 343° C. (650° F.). Among these are crudes in which about 10% to about 30% or more of the total volume consists of compounds so heavy in molecular weight that they boil above 552° C. (1025° F.) or at least will not boil below 552° C. (1025° F.) at atmospheric pressure.

Because these high boiling components of crude oil boiling above 343° C. (650° F.) are unsuitable for inclusion in gasoline and some higher boiling liquid hydrocarbon fuels, the petroleum refining industry has developed processes for separating and/or breaking the molecules of the high molecular weight, high boiling compounds into smaller molecules which do boil over an appropriate boiling range. The cracking process which is most widely used for this purpose is known as fluid catalytic cracking (FCC). Although the FCC process has reached a highly advanced state, and many modified forms and variations have been developed, their unifying factor is that a restricted boiling range hydrocarbon feedstock is caused to be cracked at an elevated temperature in contact with a cracking catalyst that is suspended in the feedstock under cracking conditions in a temperature range of 510° C. to 593° C. (950° to 1100° F.). Upon attainment of a desired degree of molecular weight and boiling point reduction, the catalyst is separated from the desired catalytic conversion products.

Crude oils in the natural state contain a variety of materials which tend to have quite troublesome effects on FCC processes, and only a portion of these troublesome materials can be economically removed from the crude oil. Among these troublesome materials are coke precursors (such as nickel, vanadium, iron, copper, etc.), heavy metals (such as nickel vanadium, iron, copper, etc.), lighter metals (such as sodium potassium, etc.), sulfur, nitrogen and others. Certain of these, such as the lighter metals, can be economically removed by desalting operations, which are part of the normal precedure for pretreating crude oil for fluid catalytic cracking. Other materials, such as coke precursors, asphaltenes and the like, tend to break down into coke during the cracking operation, which coke deposits on the catalyst, impairing contact between hydrocarbon feedstock and the catalyst, and generally reducing its potency or activity level. The heavy metals transfer almost quantitatively from the feedstock to the catalyst surface.

If the catalyst is reused again and again for processing additional feedstock, which is usually the case, heavy metals in the feedstock can accumulate on the catalyst to the point that they unfavorably alter the composition of the catalyst and/or the nature of its effect upon the feedstock. For example, vanadium pentoxide tends to form fluxes with certain components of commonly used FCC catalysts, lowering the melting point of portions of the catalyst particles sufficiently so that they begin to sinter and become ineffective cracking catalysts. Accumulations of vanadium and other heavy materials, especially nickel, also "poison" the catalyst. They tend in varying degrees to promote excessive dehydrogenation and aromatic condensation, resulting in excessive production of carbon and gases with consequent impairment of liquid fuel yield. An oil feed such as crude, or a crude residual fraction or other heavy oil fraction that is particularly abundant in nickel and vanadium or other metals exhibiting undesired behavior, containing relatively large quantities of coke forming materials comprising Conradson carbon, is referred to herein as carbo-metallic oil, and represents a particular challenge to the petroleum refiner.

Several proposals for upgrading bottom of the crude barrel or high boiling portions thereof involve treating a heavy oil feed to remove the metal and Conradson carbon contributing materials therefrom prior to catalytic cracking, such as by hydrotreating, solvent extraction, thermal conversion as by visbreaking and complexing with Friedel-Crafts catalysts, but these techniques have been criticized as unjustified economically. Another proposal employs a combination cracking process having "dirty oil" and "clean oil" units such as Becker U.S. Pat. No. 2,378,531 and Bartholic U.S. Pat. No. 4,263,128 and others. Still another proposal blends residual oil with gas oil and controls the quantity of residual oil in the mixture in relation to the equilibrium flash vaporization temperature at the bottom of the riser type cracking unit employed in the process. Still another proposal subjects the feed to a mild preliminary hydrocracking or hydrotreating operation before it is introduced into the cracking unit. It has also been suggested to contact a carbo-metallic oil such as reduced crude with hot taconite pellets to produce gasoline. This is a small sampling of the many proposals which have appeared in the patent literature and technical reports.

PRIOR DIFFICULTIES

Notwithstanding, the great effort which has been expended and the fact that each of these proposals overcomes some of the difficulties involved when refining topped and reduced crudes or heavy residual portions thereof, conventional FCC practice today bears mute testimony to the dearth of heavy carbo-metallic oil-cracking techniques that are both economical and highly practical in terms of technical feasibility. Some crude oils are relatively free of coke precursors or heavy metals or both, and the troublesome components of crude oil are for the most part concentrated in the highest boiling fractions generally boiling above vacuum gas oils. Accordingly, it has been possible heretofore to largely avoid the problems provided by coke precursors and heavy metals by sacrificing the liquid fuel yield which would be potentially available from the highest boiling fractions, of the crude oil comprising a high concentration of these components. More particularly, conventional FCC practice has employed only a part of the crude oil feedstock and comprising that fraction of crude oil which boils initially above gasoline up to about 343° C. (650° F.) and an end boiling point of about 538° C. to 566° C. (1000° F. to 1050° F.). Such boiling range portions of crude oil are normally considered as being relatively free of heavy metal contamination. Such feedstocks boiling above about 343° C. (650° F.) are generally known as "vacuum gas oil" (VGO) and are obtained from crude oil by distilling off the fractions boiling below about 316° C. or 343° C. (600° F. or 650° F.) at atmospheric pressure and then further separating by vacuum distillation from the heavier 316° C.+ (600° F.+) residual fraction vacuum gas oils with an end boiling point in the range of about 482° C. to 566° C. (900° F. to 1050° F.) and more usually not above about 552° C. (1025° F.).

An oil fraction of atmospheric distillation boiling below 343° C. (650° F.) may be used in combination with vacuum gas oil as the feedstock in more conventional FCC processing. The heavier fractions of the crude oil boiling above vacuum gas oils known as resid, reduced crude, are normally employed for a variety of other purposes, such as, for instance, production of asphalt, heavy fuel oil, #6 fuel oil, or marine Bunker C fuel oil, which represents a great waste of the potential value of this portion of the crude oil barrel especially in light of the great effort and expense which the art has been willing to expend in the attempt to produce similar liquid fuel materials from coal and shale oils.

CONTAMINANTS

In general, the coke-forming tendency or coke content of a given oil feed can be ascertained by determining the weight percent of carbon remaining after a sample of that oil has been pyrolized. The industry accepts this value as a measure of the extent to which a given oil tends to form non-catalytic coke when employed as feedstock in a catalytic cracking operation. Two established tests are recognized, the Conradson Carbon and Ramsbottom Carbon tests, the latter being described in ASTM Test No. D524-76. In conventional FCC practice, Ramsbottom carbon values on the order of about 0.1 to about 1.0 are regarded as indicative of acceptable feed. The present invention is concerned with the use of hydrocarbon feedstocks which have higher Rambottom carbon values and Conradson carbon values of at least 2 which exhibit substantially greater potential for coke formation than the usual gas oil restricted feeds.

Since the various heavy metal contaminants found in residual fractions of crude oils are not of equal catalyst poisoning activity, it is convenient to express the poisoning activity of an oil containing a given metal or metals content in terms of the amount of a single metal which is estimated to have equivalent poisoning activity. Thus, the heavy metals content of an oil can be expressed by the following formula (patterned after that of W. L. Nelson in *Oil and Gas Journal*, page 143, Oct. 23, 1961) in which the content of each metal present is expressed in parts per million of such metal, as metal, on a weight basis, based on the weight of feed:

$$\text{Nickel Equivalents} = Ni + \frac{V}{4.8} + \frac{Fe}{7.1} + \frac{Cu}{1.23}$$

According to conventional FCC practice, the heavy metal content of feedstock for FCC processing is controlled at a relatively low level, e.g. about 0.25 ppm Nickel Equivalents or less. The present invention is concerned with the processing of feedstocks containing metals substantially in excess of this value, and which therefore have a significantly greater potential for accumulating on and poisoning the catalyst particles.

The above nickel equivalent formula can also be employed as a measure of the accumulation of heavy metals on cracking catalyst, except that the quantity of metal employed in the formula is based on the weight of catalyst (moisture free basis) instead of the weight of feed. In conventional FCC practice, a circulating inventory of catalyst is used again and again in the processing of fresh feed, with periodic or continuing minor addition and withdrawal of fresh and spent catalyst. The metal content of the catalyst is maintained at a level which may, for example, be in the range of about 200 to about 600 ppm Nickel Equivalents. The process of the present invention is concerned with the use of solids having a substantially larger metals content, and which therefore has a much greater than normal tendency to deposit and promote dehydrogenation, aromatic condensation, gas production or coke formation reactions. Such high metals accumulation on the solids is normally not experienced in a typical prior art gas oil FCC processing.

The present invention is concerned with fluidizable solids contact systems and a method of separation of fluidized solid-gasiform material suspensions discharged from a riser contact zone for the separate recovery of the separated materials in a high degree of purity with respect to one another.

The present invention is also concerned with the cracking of heavy oil feeds boiling above gasoline and particularly the heavier portions of crude oils comprising gas oils, reduced crudes containing substantial quantities of coke precursors, heavy metals, nitrogen and sulfur containing compounds and other troublesome components particularly associated with vacuum resids. These heavier fractions with or without vacuum gas oils may be processed either alone or in conjunction with a middle distillate boiling between 204° C. and 343° C. (400° F. and 650° F.) thereby substantially increasing the overall yield of liquid fuels comprising gasoline, light cycle oils and other liquid and gaseous fuels from a given barrel of crude oil. It is submitted that the suspension breaking technique of this invention upon discharge from a riser contact zone is uniquely advantageous for use in handling inert and catalytic finely divided solids used in treating high boiling carbo-metallic oil fractions contributing substantial Conradson or Ramsbottom carbon and metal contaminants. The combination is also economical and technically useful in separating regeneration flue gas solids suspensions with a high degree of efficiency with a minimum of high temperature tolerant cyclone separation equipment.

In a more particular aspect, the present invention is concerned with obtaining the separation of an upwardly flowing relatively dilute or dispersed phase suspension of solids upon discharge from a riser contact zone into a disengaging vessel. Separation in an amount of at least about 95% in a first stage suspension breaking zone whereby the entrainment of solids with separated gasiform material is of a very low order of magnitude of less than about 7% and more usually less than about 5% is particularly achieved and desired.

The suspension breaking technique of this invention is substantial measure relies upon impacting a riser discharged suspension of solids and gasiform material upon or against a concave or horizontal flat surface area spaced a limited or restricted distance above the riser open end in the disengaging vessel whereby a very dense phase or mass of solids is formed by compaction against said impact surface. This compact dense phase of solids is thereafter momentum forced radially outward and away from disengaged gasiform material of the riser outlet. During formation of the compact or dense phase of solids, the gasiform material in the suspension is forced out or squeezed out and disengaged from the void space between particles for rapid flow into a low velocity region or zone therebelow of lower pressure outside of the discharged suspension stream and beneath the dense compact mass of solids moving radially outward. A gasiform material withdrawal recovery zone of annular configuration is located in this low velocity lower pressure region. The region of low velocity and lower pressure above defined and comprising the highest concentration of separated gasiform material containing little entrained particle material is thus available for rapid withdrawal as gasiform product material into the reduced pressure annular zone open in at least its upper end. The withdrawn gasiform material is then passed to cyclone separation such as a plurality of parallel arranged single stage cyclone separation zones attached to said annular zone. Separation and recovery of entrained solid fines from the gasiform material is obtained in the parallel arrangement of cyclone separation zones. The gasiform material of the suspension may be hydrocarbon conversion product vapors, stripping gas vapors, particles conveyance gaseous material, combustion product flue gases and combinations of two or more compatible gases. The fluid solid particle material may be inert solid particles of fluidizable particles size, catalyst particles, sand, coal particles or other solid particle material conveyed by gasiform materials in dispersed phase through a transport zone.

The separation phenomenon and technique of the invention relies upon maintaining a selected discharge suspension velocity for a given diameter riser conveyance zone of a magnitude sufficient to form the compact dense mass of solids separated from gasiform material which is thereafter momentum moved radially outward beyond the limits of the lower pressure region comprising the annular withdrawal zone. This permits the accumulation of displaced gasiform material accumulated in a zone between the radially moving mass of solids and the annular gasiform material withdrawal zone. On the other hand, too high a discharge velocity prevents the desired separation formation of the compact dense mass of solids and thus the disengaging separation of gasiform material from suspended solids. Thus, the suspension discharge velocity must not be too high an order of magnitude to accomplish the high efficiency separation achievable by the technique of this invention. Furthermore, the impingement surface is preferably flat or concave to form the desired compact mass of solids substantially free of suspending gasiform material.

In yet another aspect, the present invention is concerned with the utilization of this high efficiency suspension breaking technique with cyclone separation systems suitable for removal of fines, up to about 5 or more percent from the relatively large volume of gasiform material charged thereto. Thus, the initially separated relatively large volume of gasiform material of the discharged suspension is distributed to a plurality of parallel arranged single stage cyclone separation zones, the number of which used will efficiently process the volume of gasiform material discharged from the riser contact zone. This, of course, will vary with the size of riser transport zone employed. The cyclone separation zones used for this purpose may be of a size to optimize gas velocities within the range of 60 to 80 ft/sec or whatever velocity is most suitable for optimum separation efficiency. Cyclones which are efficient at gas velocities of about 70 ft/sec are desirable.

It is contemplated placing the cyclones within or external to the disengaging vessel housing the upper discharge end of a solids suspension riser contact zone or transport zone. When the cyclones are positioned within the disengaging vessel, space restriction may require the use of a higher number of relatively small cyclones to handle the total volume of gasiform material passing through the riser and cyclone system. On the other hand, when locating the cyclones external to the disengaging zone or vessel, larger size cyclones may be used of a lesser number to handle the volume of gasiform material passed through a given riser transport system. In either of these arrangements it is contemplated passing cyclone separated fines to a lower portion of the disengaging vessel for mixing with initially separated and collected solid particles as a mass of solid particles for further use as desired. The gasiform material separated from the entrained solid fines by the parallel cyclone system will be collected as a common gasiform stream for further use as desired depending on composition thereof. That is, gasiform material comprising combustion products may be used in CO boilers to generate steam, power recovery prime movers and a combination thereof. A gasiform product of thermal and/or catalytic conversion may be fractionated and separated in down stream separation zones.

The present invention is concerned with the recovery of gasiform material separated from fluid solid particles encountered during regeneration of catalyst fluid particles used in the conversion of high boiling portions of crude oils known as topped crudes, reduced crudes, residual oils and vacuum resids recovered as the bottoms product of vacuum distillation. These high boiling feeds contain substantial quantities of coke precursors and heavy metal contaminants, sulfur and nitrogen compounds. The combination solids handling operation of this invention is selected to provide a unique sequence of operations designed to dispose of and/or handle more efficiently the undesirable components of reduced crudes. The process combination of this invention represents a highly productive and economic approach to achieving of carbo-metallic feed components such as found in topped crudes, residual oils, reduced crudes and resids. A petroleum crude oil and particularly the 343° C.+ (650° F.+) portion thereof is characterized in the absence of further treatment as having a heavy metals content of at least about 5 ppm of Ni equivalents by weight and a carbon residue on pyrolysis of at least about 1% by weight.

A particularly important aspect of the combination operation of this invention is concerned with the regeneration of inert or catalyst particles used to convert the above identified heavy oil feeds and comprising substantial coke deposits referred to herein as hydrocarbonaceous material is accomplished within selected temperature limits, a restricted solids inventory and apparatus arrangement contributing substantially to the economic advantage of the combination operation.

It is well known that an increase in the level of coke or carbonaceous deposits on fluid solids such as contributed by heavy oils and resids will increase substantially the temperature during combustion in a regenerator and thus establish a substantial temperature difference between a hydrocarbon conversion reactor and the solids regenerator. Therefore, to satisfy reactor temperature requirements following combustion of substantial coke deposits, a reduction in catalyst circulation from a regenerator to a reactor is normally required. However reducing the catalyst circulation rate and thus the catalyst to oil ratio in the reactor will normally result in a loss in conversion of the feed. To compensate for such a conversion loss, a higher reactor temperature is usually required which higher temperature can contribute to a substantial change in product yield structure generally in the direction of lighter products and less desired liquid gasoline product. In addition, the present day crystalline zeolite cracking catalysts are known to be sensitive to high temperatures and this condition is aggravated in the presence of steam and metal contaminants. Thus, it is particularly desirable to restrict the temperature encountered by the solid particulate such as equilibrium catalyst particles not to exceed about 871° C. (1600° F.) and preferably the temperature of the catalyst is kept below 815° C. (1500° F.) during regeneration thereof to remove coke by combustion.

In a more particular aspect, the present invention is concerned with a riser dispersed phase hydrocarbon conversion operation and particularly a fast upflow solids regeneration operation employing a regenerator design of larger diameter in a bottom portion than an upper portion and of reasonably low catalyst inventory. Such an arrangement of apparatus is economically attractive and effective for restricting the regeneration temperature between limits of rapid ignition temperature of carbonaceous deposits, and maintaining an incremental temperature increase thereof within restricted desired limits as encountered during combustion of carbonaceous deposits. Preferably, the regeneration operation is restricted to obtain a desired residual low coke level below 0.25 wt % and more usually below about 0.10 wt % residual carbon on regenerated solid particles. More particularly, control of the regeneration temperature increase during combustion is effected by maintaining a ratio between solid particles comprising carbonaceous deposits to regenerated solid particles of little or no residual coke thereon. The thus formed mixture is passed upwardly through the riser regeneration zone. The initial mix temperature of regenerated solid particles mixed with the spent coke contaminated particles is preferably about 593° C. (1100° F.) to about 649° C. (1200° F.). A further control on the generated combustion temperature increase is achieved by limiting the concentration of oxygen in the combustion supporting gas employed for combustion of carbonaceous deposits to produce a CO a $CO_2$ rich flue gas product or a mixed $CO-CO_2$ flue gas product. Thus, the more CO that is burned in the presence of the solid particles in the combustor and particularly the dispersed phase portion thereof, the higher the temperature they will encounter.

In one embodiment, the regeneration zone or combustor is of larger diameter in a lower portion thereof than in an upper confined discharge portion through which all regenerated solid particles and combustion product flue gases are passed. Thus, the concentration of solid particles in the upflowing combustion gases as much higher, in the range of 20 to 35 lbs/cu. ft. in the lower larger diameter portion of the combustor below the riser. In the more restricted diameter upper transport riser portion of the fast upflow regeneration zone above the combustor a solids concentration in the range of 5 to 15 lbs/cu. ft. is normally maintained, but it may be less than 5 lbs/cu. ft. In any given solid inventory regeneration system, the diameter of the upper portion of the riser combustor is sized to accomplish transfer of a suspension of solid particles in combustion product flue gas at a velocity imparting greater momentum to the mass of solid particles than to the flue gas upon discharge from the upper open end of the combustor whereby the flue gas is separated from solid particles. The lower momentum flue gas is separated from fines with a high degree of efficiency of at least 95 or more percent before being withdrawn into an annular open end collar zone about the upper discharge end of the combustor zone. The annular zone or collar adjacent to but separated from the combustor upper open end is in open communication by confined passageways with a plurality of parallel arranged single stage cyclone separation zones attached to the end of each passageway. An important aspect of this solid-gasiform material separation and recovery system of this invention is directed to using sufficiently high velocity upflow solids suspension operations in excess of 15 up to 100 ft./sec. and preferably at least 60 or 70 ft/sec. The passage of separated gasiform material to each of said parallel arranged cyclone separation zones is accomplished by a small amount, less than about 5 percent, of entrained particle fines at a velocity generally below the riser discharge velocity. A velocity most efficient for the size of the cyclone and volume of gasiform material passed to the cyclone is employed. Thus, the cross-sectional area of the mouth to each cyclone times the number of cyclones employed must be equal to or greater than the cross sectional area of the combustor outlet or of the annular zone cross sectional area about the combustor discharge. It must be sufficient to efficiently handle with minimum pressure drop the volume of gasiform material passed through the combustor or received from a riser hydrocarbon zone.

It has been found in a study of cyclone operating efficiency that the volume and velocity of charged gasiform material must be restricted to avoid exceeding in high pressure drop in the cyclone; prevent blow out in the cyclone display and limit charging a volume of suspended solids above that which can cause flooding of the cyclone.

In yet another aspect, the regeneration operation of this invention permits the recovery of hot regenerated solid particles at a pre-selected and desired temperature, generally not above about 815° C. (1500° F.). It also permits recycling a temperature restrained portion thereof below 815° C. (1500° F.) to the hydrocarbon zone associated therewith. The collected and regenerated solid particles including those separated by compaction and momentum differential as well as by cyclone means are passed in part through a cooling zone for effecting indirect heat exchange with boiler feed water so as to cool the particles by an amount within the range of 100 to 200 degrees before passing the cooled solids to a lower bottom portion of the regenerator or combustor zone. Provision is also made for recycling hot freshly regenerated solid particles directly to a bottom portion of the combustor or to hydrocarbon conversion. Collected regenerated solids may be recycled from an upper regenerated solids collection zone by internal and/or external standpipe means directly to a lower portion of said riser combustor zone. Thus, control of the combustor temperature is effected with recycle of one or both of cool and hot regenerated solid particles; by controlling the concentration of oxygen in combustion supporting gas; and providing desired coke burn by maintaining a desired mix ratio between coke contaminated solids to solids relatively free of coke passed upwardly through the combustor. Thus, three different controls may be employed to maintain desired regeneration temperatures.

It is contemplated in yet another aspect of this invention of providing a confined solid particle material riser mixing or suspension forming zone communicating with a bottom portion of the combustor for discharging an upflowing highly mixed relatively dispersed phase suspension of a solids concentration less than about 30 lbs/cu. ft. into the enlarged bottom portion of the combustor zone. In this embodiment, a mixture of spent solid particles, partially cooled recycled freshly regenerated solid particles is formed at a temperature sufficiently elevated in said confined mixing zone to assure rapid ignition of carbonaceous deposits substantially upon upflow discharge into the enlarged bottom portion of the combustor zone. It is also contemplated forming a mixture of the spent solids comprising carbonaceous deposits with sufficient hot regenerated solids as recovered to achieve a more elevated mix temperature in the presence of combustion supporting oxygen taining carbonaceous deposits in oxygen containing gas within the range of 538° C. to 677° C. (1000° F. to 1250° F.) in the lower bottom portion of an upflowing solids combustor zone so as to achieve an exit temperature from the restricted diameter upper open end portion of the combustor zone below 871° C. (1600° F.) and more usually below 815° C. (1500° F.). A combustor solids outlet temperature with the range of 732° C. to 787° C. (1350° F. to 1450° F.) is particularly desirable for achieving high conversions of a heavy residual oil feed comprising vacuum reside to form liquid fuel products comprising light gasoline, light and heavy cycle oils. Avoiding hydrothermal damage to an active cracking catalyst employed in the conversion of high boiling residual oils is particularly desirable in contributing to the economic value of the operation.

FEEDS

Some hydrocarbon feeds which may be processed in the combination operation of this invention are specifically identified in Table 1 below.

TABLE 1

| Oil or Crude | API Grav. 650+(2) Total | Volume % of 650+ Fraction Boiling at | | Ramsbottom Carbon Content | | Wt. ppm Metals | | | | Wt. % S in 650+ Total | Weight of Nitrogen (ppm) 650+ Fraction | | Wt. ppm Na |
|---|---|---|---|---|---|---|---|---|---|---|---|---|---|
| | | 650–1025 | 1025+ | 650–1025 | 1025+ | Ni | V | Fe | Ni Equiv. | | Total | Basic | |
| VGO | 28.4 | 100 | 0.0 | 0.38 | 0.38 | 0.2 | 0.1 | 2.6 | .059 | .83 | 722 | 260 | 0.8 |
| Mexican Isthmus | 16.9 (21.3) | 65.3 | 34.7 | 0.49 | 4.96 | 2.5+ | 33.8 | 1.9 | 9.81 | 2.75 | 950 | 450 | |
| Mexican Kurkuk(1) | 17.4 | | | | 9.30 | 35.0 | 99.0 | 17.0 | 50.02 | 2.94 | 2100 | 723 | 1.8 |
| Murban | 23.1 | 78.7 | 21.3 | 0.49 | 3.99 | 3.0+ | 1.5 | 11.9 | 4.99 | 1.64 | 512 | 200 | 7.5 |
| Arabian Light | 19.1 | 64.7 | 35.3 | 0.47 | 6.56 | 6.4 | 24.7 | 3.2 | 12.00 | 2.39 | 940 | 507 | 9.2 |
| Arabian Medium | 14.5 | 51.8 | 48.2 | 0.46 | 9.00 | 19.6 | 63.0 | 2.9 | 33.13 | 4.43 | | | |
| Ekofisk | 22.7 | 72.8 | 27.2 | 0.36 | 4.42 | 1.4 | 3.0 | 2.4 | 2.36 | 0.38 | | | |
| Fosterton | 10.9 | 43.6 | 56.4 | 0.42 | 16.81 | 48.8 | 119.0 | 3.1 | 74.03 | 4.22 | | | |
| Iranian Light | 17.4 | 60.8 | 39.2 | 0.48 | 9.01 | 21.9 | 60.0 | 3.1 | 34.84 | 2.50(4) | | | |
| La./Miss. Sweet | 23.7 | 80.2 | 19.8 | 0.33 | 4.36 | 2.7+ | — | 8.5 | 3.90 | 0.26 | | | |
| Wyoming Sour | 12.4 | 40.7 | 59.3 | 0.32 | 15.1 | 0.6 | 70.0 | 2.0 | 15.47 | 3.84 | | | |

(1)A refinery blend of Mexican and Kirkuk crudes.
(2)Throughout the table 650 and 1025 refer to 650° F. and 1025° F. respectively; 650+ refers to 650° F.+ material as defined below.
(3)Copper level was below 0.5%, except that Mexican Kirkuk contained 0.6%; all metals expressed as metal in ppm, based on the weight of the 650+ fraction.
(4)Calculated.

containing gas in the confined mixing zone. In this latter particular embodiment, recycled cooled regenerated solids may be added downstream to the confined mixing zone and/or directly to the enlarged bottom portion of the combustor zone to increase the regenerated and coke limited solid particle concentration therein so as to effect temperature increase control on the combustion taking place therein. The partially cooled solids may also be mixed above with spent solids and oxygen containing combustion supporting gas thereafter discharged from a riser such zone upwardly into the bottom portion of the combustor zone.

In any of the embodiments above briefly discussed, an important aspect of the operating concepts of this invention is to achieve a mixture of particles at a temperature achieving rapid combustion ignition of charged carbonaceous deposits for relatively fast upward flow through the combustor zone for a time in the range of about 5 to about 15 seconds. The upflowing solids and combustion supporting gas in the combustion zone is maintained to achieve a preselected alternate temperature limit suitable for further hydrocarbon conversion use without thermally deactivating catalyst particles or effecting thermal damage to the apparatus or equipment employed. Thus, it is intended to provide an initial mix temperature between regenerated solids and solids con-

BRIEF DESCRIPTION OF THE DRAWINGS

FIG. I is a diagrammatic sketch in elevation of a combination of apparatus comprising an upflow solid fluid particle regenerator or combustor zone in combination with a riser reactor zone and interconnecting conduit means for circulating solids between zones as herein discussed.

FIG. II is a diagrammatic sketch in elevation of a regeneration or combustor zone comprising a solids mixing confined riser zone discharging into the bottom of the combustor which may be used with the combustor zone arrangement of FIG. I.

Figure 1:
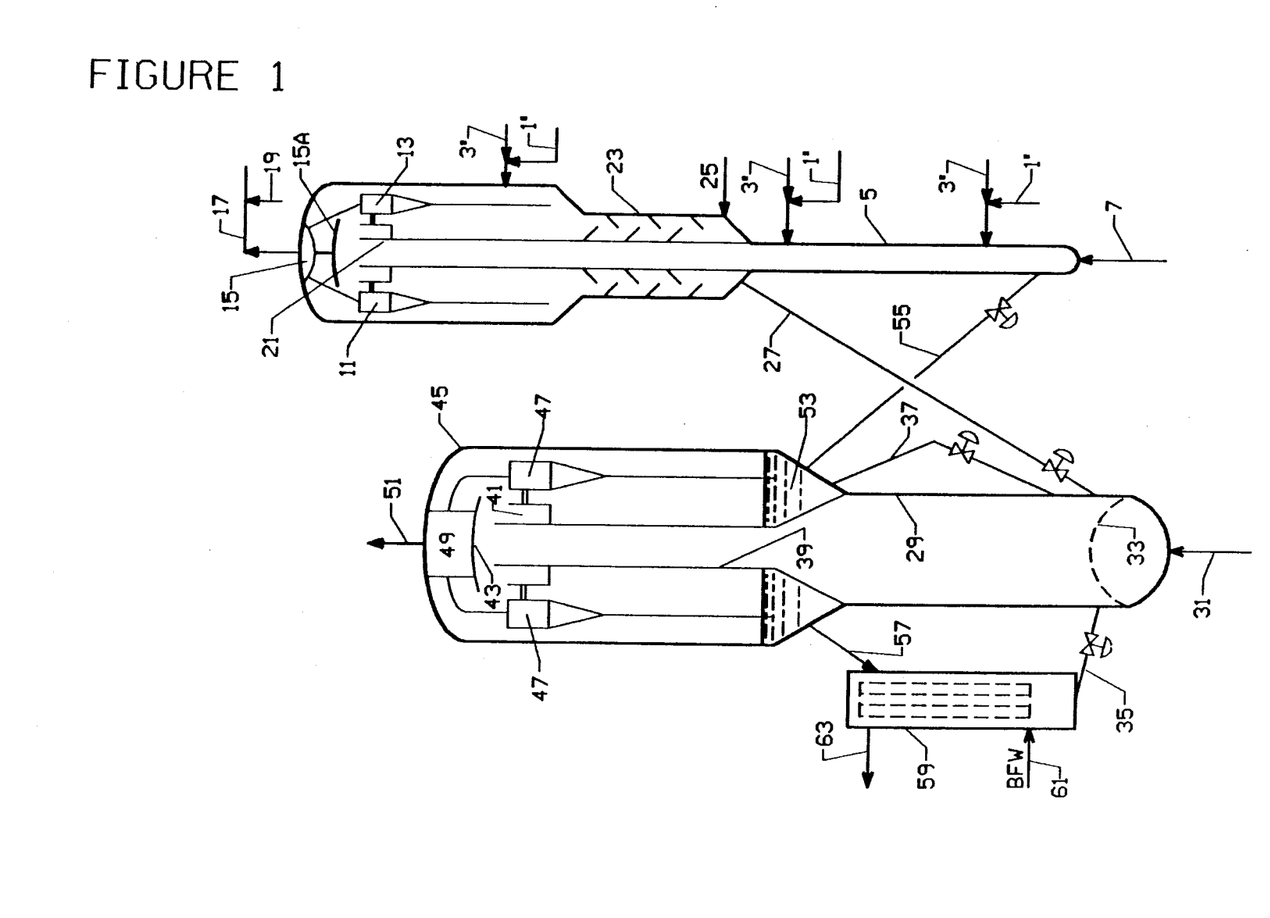
Figure 2:
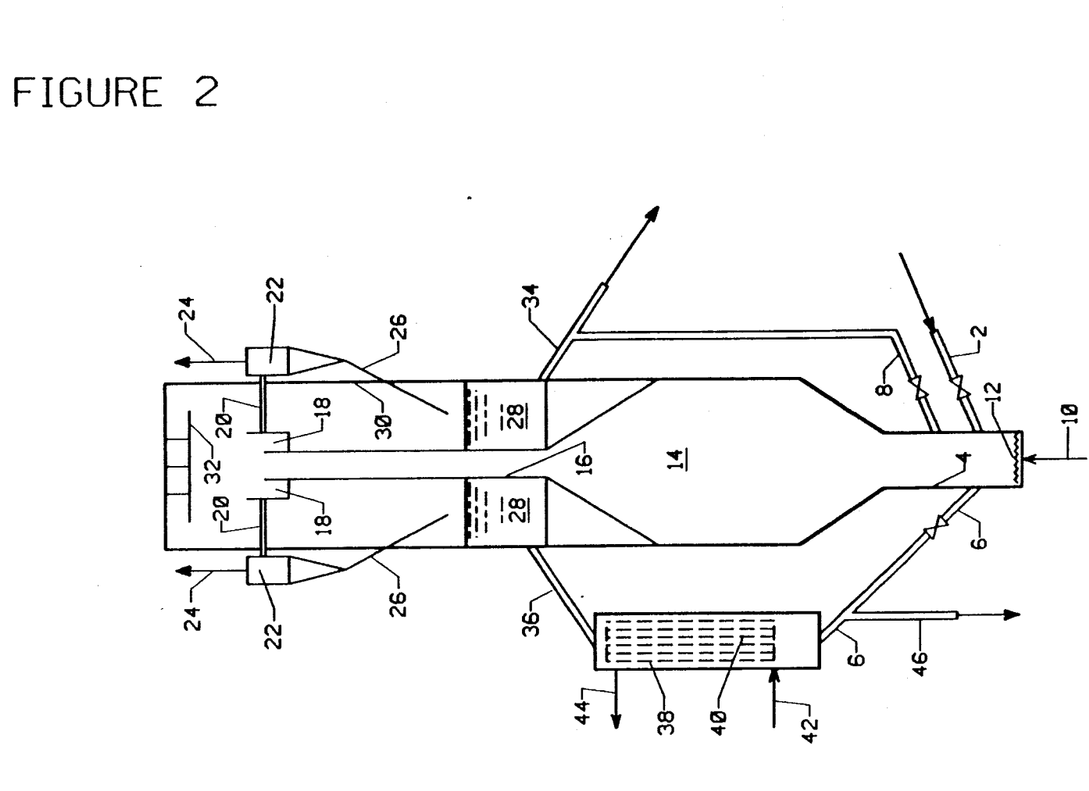

Referring now to FIG. I, by way of example, there is provided an arrangement of apparatus for effecting thermal and/or catalytic cracking of heavy oil feeds such as residual oil portions of crude oils, a reduced or topped crude oil portion comprising vacuum resid components boiling above 552° C. (1025° F.) to accomplish conversion thereof to liquid fuel products comprising gasoline, light and heavy cycle oils in combination with the removal of metal contaminants and Conradson carbon producing components in the resid portion of the feed. The fluid solids contact system of FIG. I may be employed to effect thermal visbreaking of a heavy oil feed herein identified in the presence of relatively inert solids or catalytic solids and a diluent gaseous material such as a dry gas comprising hydrogen, a wet gas recycle product, steam water and combinations thereof. On the other hand, catalytic cracking of a heavy oil feed comprising Conradson carbon contributing components and metal contaminants of iron, copper, nickel and vanadium may be accomplished in the presence of an equilibrium catalysts of considerable metals loading above 3000 ppm. The catalyst may be a hydrogen exchanged ultra stable crystalline zeolite or a rare earth exchanged crystalline zeolite containing catalyst. Thus, the fluid solids particulate employed in the combination of this invention may be a relatively inert solid sorbent clay type material, or a low activity catalytic material of amorphous and/or zeolite containing cracking components or the fluid particulate material may be a relatively high activity crystalline zeolite containing cracking catalyst distributed in a catalytic or non-catalytic matrix material.

Thermal and/or catalytic conversion of a heavy oil feed charged to a riser reaction zone is accomplished at an elevated temperature providing a riser discharge temperature in the range of about 482° C. (900° F.) up to about 649° C. (1200° F.) and preferably from about 510° C. (950° F.) up to about 566° C. or 593° C. (1050° F. or 1100° F.). Space velocity conditions and solids particle concentrations are employed in the riser reaction zone to form an upflowing suspension thereof discharged at a velocity in the range of 60 to 100 ft./sec. and providing a particle concentration in suspending gasiform materials within the range of about 3 to about 30 lbs./cu. ft. more usually about 5 to 20 or 25 lbs./cu. ft. The formed suspension may comprise a particle concentration in vaporous or gasiform material within the range of 10 to 20 lbs. per cu. ft.

In the specific arrangement of FIG. I, a solids suspending gaseous material above identified such as recycled dry gas or wet product gas comprising hydrogen, steam, low quality naphtha other suitable gaseous material and combinations thereof is charged by line 7 to the bottom of riser zone 5 for admixture with hot regenerated solids obtained as herein provided and charged thereto by standpipe 55 to form an upflowing relatively high velocity suspension thereof. The heavy oil feed preferably in a highly atomized condition in admixture with an atomizing diluent such as water and/or steam added by conduit 1 is charged by conduit 3 to a downstream portion of riser zone 5 for distributed dispersed phase contact with the suspended solids flowing upwardly through the riser. The heavy oil feed may be charged to a bottom portion of riser 5 with a diluent material as above provided or the materials may be charged to a downstream section of the riser but below the solids stripping zone as shown by conduit 3' and 1' or to a more downstream section of the riser by 3" and 1". The plurality of feed inlets spaced as above provided in the riser permit achieving a hydrocarbon residence time in the riser within the range of 0.5 to 3 seconds, it being desirable to achieve a hydrocarbon residence time in the riser of less than 2 seconds depending on feed charged and velocity of the formed suspension passing upwardly through riser 5. It is contemplated, but not shown, expanding the riser reactor 5 in a downstream portion thereof about feed inlet 3' to a larger diameter riser reactor which may be cylindrical or gradually expanding to allow for increased vaporous product of conversion without exceeding discharged velocity conditions of about 80 ft./sec. in a downstream discharge portion of the riser reactor 5.

The top upper end of riser 5 is sized or arranged to accomplish separation of the suspension discharged from the riser as above described whereby a momentum differential is established between compact solids and displaced vaporous or gasiform materials to achieve rapid high efficiency separation therebetween of at least 90%. The separated vaporous material is withdrawn substantially immediately into an annular zone open in the upper end and about the open upper end of the riser and beneath the compact mass of solids. The vapors thus withdrawn are passed by a plurality of confined radiating passageways to cyclone separator means attached to the end of each passageway. The number and size of cyclones and open passageways provided thereto are sufficient to particularly optimize the operating efficiency of each cyclone charged with gasiform material at a velocity in the range of 65 to 75 ft./sec. so the single stage cyclone separating means of low pressure drop less than 2 psi may be employed for high efficiency fines removal. Cyclones 11 and 13 are representative of a plurality of parallel arranged cyclones in accordance with this invention and provided for the purpose of recovering entrained solids fines from vaporous or gasiform material recovered from a riser contact zone. The separated fines are recovered by appropriate dipleg means attached to each cyclone. Vaporous product materials separated by the plurality of cyclones is passed to a plenum chamber 15 which may comprise a concave bottom section as shown or a separate horizontal or concave plate 15A may be suspended beneath chamber 15 by an amount positioning the plate from 1 to 3 diameters above the riser outlet diameter and preferably about 1.5 to 2 diameters above the riser outlet. Other suitable product recovery means may be used such as a common manifold for product removed therefrom by conduit 17. The vaporous product in conduit 17 may be quenched to suppress further thermal conversion as desired with a liquid product charged by conduit 19 and removed from downstream fractionation zone not shown. A light or heavy cycle oil product may be used for this purpose.

The solid particles separated from vaporous material as above discussed within enclosing separation and solids collection chamber 21 fall into an annular stripping zone 23 therebelow wherein the solids are counter currently contacted with a stripping gas such as steam, $CO_2$, product dry gas, or mixture thereof charged by conduit 25. Stripping of the solids is accomplished at an elevated temperature within the range of 482° to 566° or 593° C. (900° to 1050° or 1100° F.) or as recovered from the riser reaction zone 5. Stripping of the collected solids is for the purpose of removing any entrained vaporous material from the particles. The stripped solids are then passed by conduit 27 to a lower bottom portion of the riser combustor section 29 of the regeneration operation as discussed herein. The lower combustor section 29 of FIG. I is of larger diameter than an upper confined discharge passageway 39 through which all solids and combustion product flue gases must pass from the initial combustor section 29. Thus, the concentration of solids in suspending combustion gases is higher in a lower section of the combustor than in the upper restricted discharge section thereof. Combustion supporting oxygen containing gas is charged to a bottom portion of the combustor section by conduit 31 and beneath grid means 33 or other suitable means provided for distributing the charged combustion supporting oxygen containing gas. The spent solids comprising carbonaceous deposits of hydrocarbon conversion discharged by conduit 27 are mixed in a bottom portion of the combustor above grid 33 with recycled regenerated solids in conduit 35 which have been partially cooled as discussed below and/or with hot regenerated solids as recovered from the combustor and charged by conduit 37 to obtain a mixture thereof which will effectively limit combustion temperatures encountered within the combustor as herein provided.

In combustor section 29 the mixture of spent solids, partially cooled regenerated solids with or without high temperature regenerated solids separately charged thereto are mixed in combustion supporting oxygen containing gas in the lower portion of the combustor to form an upflowing dispersed solid particle suspension of a concentration within the range of 10 to 35 lbs. per cubic foot, but more usually not above about 30 lbs/cu. ft. A mix temperature is selected to accomplish rapid combustion of charged hydrocarbonaceous deposits of said heavy oil conversion. The suspension of spent and regenerated solids maintained during combustion of carbonaceous material is temperature restricted within the range of about 593° C. (1100° F.) to about 871° C. (1600° F.) and more usually within the range of about 649° C. (1200° F.) to about 815° C. (1500° F.). The suspension of solids being regenerated by combustion of carbonaceous material flowing upward through section 29 and restricted passage 39 are maintained under velocity conditions providing a particle residence time in the combustor within the range of 50 to 20 seconds and more usually from about 8 to about 10 seconds residence time. A velocity is provided in the riser discharge section 39 sufficient to impart upon discharge from the open upper end thereof a greater momentum to the solids particles than the combustion product flue gases whereby the flue gases are rapidly separate from solids particles for withdrawal into annular zone 41 as above discussed. The discharged and compacted mass of solids is directed outwardly and downwardly within chamber 45 by plate 43 for recovery in a lower bottom portion thereof comprising a stripping section. The flue gas thus disengaged from the mass of compact solids and separated by momentum differential are caused to flow into the annular zone 41 about the combustor discharge and thence by a plurality of confined radiating passageways to a plurality of parallel arranged single stage cyclone separation zones 47. The number of cyclone separation zones provided and the size utilized are sufficient as discussed above to accomplish a more particular and optimum separation efficiency between gases and entrained fines in each cyclone zone. This unique combination of suspension separation in combination with a plurality of parallel arranged single stage cyclone separation zone not only reduces the number of exposed metal appendages required in the regeneration zone separation section but the combination provides a more economic arrangement of higher separation efficiency for the reasons discussed herein. The suspension breaking combination of the invention reduces the amount of fines emitted with hot flue gases from the regeneration zone and permits reducing high temperature equipment cost which satisfy pollution opacity requirements. Thus, the gasiform solid particle separation equipment inventory for hydrocarbon conversion and solids regeneration is substantially reduced and simplified thus contributing to substantial economic savings in the combination of apparatus without sacrificing high standards of operation satisfying environmental protection standards.

The hot flue gases further separated from entrained fines in cyclones 47 pass into a collection zone represented by chamber 49 before withdrawal by conduit 51. The flue gas collection zone may be a manifold exterior to the upper part of chamber 45 or other suitable collection means or device. Solids particle fine material separated by cyclone separation are collected with a bed of hot regenerated solids 53 in an annular zone or chamber 45 about the lower portion of passageway 39. The collected solids may be fluffed or fluidized with suitable hot gaseous material introduced to a lower bottom portion thereof. Gaseous materials suitable for the purpose include $CO_2$, $N_2$, air and combinations thereof.

The hot regenerated solids of residual carbon less than 0.25 wt % and collected in bed 53 at an elevated temperature within the range of 732° C. to 815° C. (1350° F. to 1500° F.), more usually below about 787° C. (1450° F.) are passed in part by conduit 55 to a lower bottom portion of riser 5, to the lower bottom portion of combustor 29 by conduit 37 and a portion thereof is passed by conduit 57 to heat exchanger 59 wherein the solids are passed in indirect heat exchange with boiler feed water to produce steam. Boiler feed water may be charged by conduit 61 to a tubular heat exchange means or other suitable indirect heat exchange tubular means confined within heat exchanger 59. A heated water-steam mixture is recovered by conduit 63 for use as desired. The hot solids pass downwardly through the heat exchanger 59 in direct contact with fluid containing heat exchange tubes may be fluffed with gaseous material charged to the bottom thereof sufficient to aid flow of the solids downwardly through the bundle of tubes in the heat exchanger and containing heat exchange fluid.

In heat exchanger 59 the temperature of the solids is reduced from about 100 to about 250 degrees and more usually between 150 and 200 degrees before withdrawal therefrom by conduit 35 for passage to a bottom portion of the combustor zone 29 as discussed above.

The system of FIG. I may be used in a wide variety of applications. For example, it may be used as a thermal visbreaking zone or a metals removal zone with inert sorbent particle material under relatively mild thermal conversion conditions designed to particularly remove some metal contaminants and some Conradson carbon contributing components but absent significant production of thermally produced naphtha. On the other hand, a more severe thermal visbreaking operation may be accomplished therein which produces some thermal naphtha product. In yet another embodiment the system of FIG. I may be employed for the catalytic cracking of distillate materials boiling above gasoline or kerosene, for gas oils alone, for residual oils comprising gas oils such as obtained from atmospheric distillation and vacuum tower bottoms with or without a product of solvent deasphalting and for catalytically upgrading topped and/or reduced crudes. In yet another aspect, two of the systems of FIG. I may be used in sequence with one another to effect a mild or severe thermal visbreaking of a heavy oil feed comprising vacuum resid and converting the vaporous products thereof with or without separation between stages with a crystalline zeolite conversion catalyst to produce gaseous and liquid fuel product including gasoline.

Referring now to FIG. II by way of example of a separate embodiment, there is provided a modification of the apparatus of the FIG. I regenerator combustor which may be used with the riser reactor 5 system of FIG. I. In the arrangement of FIG. II, spent solids particle material comprising carbonaceous deposits to be removed by combustion is charged by conduit 2 to the lower bottom portion of a riser mixing zone 4. Regenerated solid particle material which has been partially cooled as discussed herein is charged by conduit 6 to zone 4 and hot freshly regenerated solids as required are charged by conduit 8 to the riser mixing zone 4 as shown on the drawing. The charged solids may enter the riser mixing zone at the same level or different levels which is most suitable to achieve a rapid mixing thereof to achieve a mix temperature equal to or greater than about 538° C. (1000° F.) and preferably at least about 621° C. or 64920 C. (1150° F. or 1200° F.). Combustion supporting oxygen containing regeneration gas of a desired oxygen concentration which may or may not be preheated is charged to a bottom portion of zone 4 by conduit 10 communicating with distributor 12. The regeneration gas may be preheated by direct or indirect heat exchange with hot regenerated solids or by other known means such as a combustion heater zone not shown. A rising fluid phase suspension of solids in combustion gas of a solid particle concentration within the range of 10 to 30 lbs./cu. ft. is formed in mixing zone 4 at an elevated temperature sufficient to initiate combustion of carbonaceous material and particularly the hydrogen component in deposited hydrocarbonaceous material of residual conversion. The dilute phase suspension formed in riser zone 4 passes upwardly for discharge into an expanded larger diameter section 14 of the combustor zone wherein the concentration of solids particles is increased to a higher order of magnitude and may be increased upwardly to about 25 or more lbs./cu. ft. but less than about 35 lbs./cu. ft. The suspension of solids in combustion supporting gas moves generally upward through the expanded section 40 of the combustor to a more restricted smaller diameter discharged passageway 16 wherein suspended solids in combustion product flue gases achieve a relatively high discharge velocity in the range of 60 to 100 ft./sec. and preferably at least about 80 ft./sec. Combustion of formed CO and coke may be also accomplished in riser section 16. The suspension is discharged from the upper open end of passageway 16 under the separation conditions of this invention whereby the disengaged flue gas product of combustion of lower momentum are rapidly separated from the discharged compact mass of solids of higher momentum. In the arrangement of this figure the discharged solids impinge upon a flat or concave plate represented by plate 32. The separated flue gases pass into an annular zone 18 about the upper open end of passage 16. The top edge of the annular zone is shown downstream of the top edge of riser passageway 16. However, it may be at the same level or below the outlet level of passageway 16. The flue gases pass into the annular zone 18 and thence through a plurality of separate and confined radiating passageways 20 to a cyclone 22 on the end of each passageway. There are a plurality of such radially connected cyclones in parallel arrangement and the number thereof is sufficient to optimize the separation of the volume of combustion product discharged from the riser combustor. Cyclone separation efficiency at flue gas velocities within the range of 65 to 75 ft./sec. is particularly desired without exceeding a 1.5 lb. pressure drop. The cyclones may be positioned within or outside chamber 30 as shown when positioned outside, larger cyclones may be employed in parallel combination than when the cyclones are positioned within the vessel 30. Whichever arrangement is employed, it is important to employ cyclones of the highest operating efficiency for accomplishing the results desired. Flue gases separated from entrained fines by the plurality of parallel cyclones 22 are recovered as by conduit 24 communicating with a common flue gas recovery zone not shown for further treatment such as the removal of sulfur and/or nitrogen oxides before discharge to the atmosphere. Separated fines are passed from cyclone 22 by a dipleg 26 to an annular bed of regenerated solids 28 in the lower portion of a solids collecting zone 30. The hot regenerated solids collected as an annular bed 28 may be fluffed or fluidized as desired with gaseous material which may be inert or comprise oxygen and charged to a bottom portion of the bed by means not shown.

Solid particle material discharged from the upper end of riser passageway 16 impinges upon a spaced plate 32 above the riser outlet as herein discussed. The impinged solids form a compact mass which is moved radially outwardly and away from the upper open end of annular zone 18. The diverted compact mass of solids settle out adjacent the wall of zone 30 to form annular bed 28. Hot regenerated solids at a temperature below 815° C. (1500° F.) are withdrawn from bed 28 by conduit 34 for passage to a hydrocarbon conversion zone. On the other hand, all or a portion of these hot regenerated solids may be passed by conduit 8 to the riser mixing zone 4. Another portion of the solids comprising bed 28 are withdrawn by conduit 36 and passed to a heat exchange zone 38 for downward flow therethrough. Heat exchange zone 38 comprises a bundle of heat exchange tubes 40 to which boiler feed water is charged by conduit 42 and steam-water mixture is recovered by conduit 44. In heat exchanger 38 the hot regenerated solids are indirectly cooled by an amount within the range of 100 to 200 or 250 degrees before withdrawal therefrom by conduit 6. The withdrawn cooled regenerated solids comprise residual carbon of less than 0.25 wt % and more usually not above about 1.10 wt %. Conduit means 46 is provided for passing partially cooled regenerated solids to a thermal visbreaking zone depending on whether inert or catalytic solids are regenerated in the system of FIG. II. It is further contemplated passing a mixture of solids withdrawn by conduit 46 and 34 to provide a mixture thereof for converting hydrocarbons at a desired catalyst to oil ratio.

It may be preferred in some operations to effect catalytic conversion of a heavy residual oil feeds at a temperature below the catalyst particle temperature collected in bed 28 in which case some partially cooled catalyst particles alone may be passed by conduit 46 to a hydrocarbon conversion zone rather than the higest temperature regenerated catalyst withdrawn by conduit 34 or a mixture of partially cooled and recovered high temperature particles may form to achieve a desired mix temperature for passage to the heavy oil conversion operation.

Having thus generally described the improved novel concepts of the present invention and described specific examples and systems directed to utilization thereof, it is to be understood that no undue restrictions are to be imposed by reason thereof except as defined by the following claims.

What is claimed is:

1. In a process for upgrading heavy oil streams comprising topped crudes, residual oils, reduced crude, vacuum resid and combinations thereof comprising carbo-metallic impurities, wherein a suspension of the hydrocarbon feed and solid catalyst particles are passed upwardly through a riser cracking zone and solid catalyst particles contaminated with carbonaceous deposits from hydrocarbon cracking are stripped and passed to a catalyst regeneration operation, the improvement which consists of:
   (a) forming a mixture of spent catalyst comprising carbonaceous deposits with a separate stream of high temperature regenerated solid catalyst and a separate stream of cooled regenerated catalyst which has been cooled to a temperature 100°-200° F. below the high temperature regenerated catalyst and with oxygen containing gas to provide a mix temperature of at least 1000° F. in a short riser mixing zone discharging into the bottom portion of an enlarged section of an upflowing catalyst regeneration zone;
   (b) regenerating said mixture in said enlarged section and the upper transport riser section of said regeneration zone;
   (c) separating at least 95% of the combustion product gas from the regenerated catalyst particles in an annular suspension-breaking zone about the upper discharge of said transport riser;
   (d) passing a suspension comprising more than 95% regenerated catalyst particles and less than 5% combustion product gas at a temperature below 1500° F. from the open discharge end of a transport zone at a discharge velocity of 60-100 feet per second against a plate surface displaced from the open end of the transport zone a distance sufficient to achieve a compaction of the discharged catalyst particles sufficient to disengage combustion product flue gases therefrom and direct the compact mass of catalyst particles radially outward and away from a lower pressure zone of accumulated disengaged combustion product flue gases beneath the compact radially flowing mass of catalyst particles;
   (e) withdrawing disengaged combustion product gases into said annular zone in open but confined communication with a plurality of parallel arranged single state cyclone separation zones; and
   (f) the number of said parallel arranged cyclone separation zones being sufficient to handle the volume of combustion gases discharged from said riser regeneration zone to remove a major portion of entrained solid catalyst fines in the flue gases passed thereto.

2. The process of claim 1 wherein said stream of high temperature regenerated catalyst at a temperature in the range of 1350° F. to 1450° F. and said stream of cooled catalyst are recycled and mixed with catalyst comprising carbonaceous deposits and oxygen containing regeneration gas in a short riser contact zone under temperature conditions in the range of of 1000° F. to 1250° F. selected to rapidly initiate combustion of carbonaceous material, discharging said mixture from said short riser contact mix zone into the bottom portion of a combustion zone comprising a more dense solid catalyst particle phase than that formed in said riser mix zone and recovering regenerated catalyst and flue gas combustion products in direct heat exchange relationship with one another from an upflowing confined dispersed phase suspension in a transport zone extension of said combustion zone.

3. A process for separating and recovering a suspension of non-catalytic particles in gasiform material which is used in a solids regeneration zone and a thermal hydrocarbon visbreaking zone consisting essentially of the steps of:
   (a) forming a suspension of non-catalytic solid particles comprising carbonaceous deposits with a separate stream of high temperature regenerated particles and a separate stream of cooled particles which have been cooled to a temperature 100°-200° F. below the high temperature particles and with combustion supporting oxygen containing gasiform material to achieve rapid ignition and combustion of carbonaceous deposits in a riser regeneration zone at a temperature of about 1200° F., whereby regenerated non-catalytic solid particles and flue gas are produced;
   (b) forming a suspension of regenerated non-catalytic solid particles in a hydrocarbon feed to form vaporous products passing through a riser conversion zone at a velocity of 60 to 100 ft. per second, wherein a thermal visbreaking operation is effected in the presence of 5–25 pounds per cubic foot of said particles;
   (c) separating at least 95% of the flue gas of step (a) and 95% of vaporous products of step (b) in reduced pressure zones about the upper ends of said risers;
   (d) discharging suspensions containing more than 95% solid particles and less than 5% flue gas and 5% vaporous products from step (c) above against a surface area displaced above each said riser outlet from 1 to 2 diameters of the riser diameter under velocity conditions selected to form a compact mass of radially flowing solids of sufficient momentum to be separated from displaced flue gas and vaporous products;
   (e) collecting said displaced flue gas and said vaporous products in a zone of lower pressure beneath said flowing compact mass of solids for passage to parallel arranged single stage cyclone separation zones; and
   (f) passing non-catalytic solids separated and recovered from each riser of steps (a) and (b) above to the other step of (a) and (b) above to complete the circulation of non-catalytic solids between the conversion and regeneration steps.

4. The method of claim 3 wherein the riser regeneration zone comprises a larger diameter lower portion in open communication with an upwardly extending riser dispersed solids phase transport zone of smaller diameter and a portion of the particles separated from combustion product flue gas are recycled to said larger diameter lower portion.

5. The method of claim 3 wherein recycled regenerated non-catalytic particles are mixed with spent non-catalytic particles and oxygen containing gas in a short riser mixing zone discharging into the bottom of said larger diameter portion of said regeneration zone.

* * * * *